April 4, 1961     K. O. TECH ET AL     2,978,689
CONTROL MECHANISM FOR MACHINE TOOLS AND THE LIKE
Filed May 9, 1955                                     5 Sheets-Sheet 1

INVENTORS.
Kurt O. Tech
Herbert H. Martens
BY
Harness, Dickey & Pierce
ATTORNEYS.

April 4, 1961 K. O. TECH ET AL 2,978,689
CONTROL MECHANISM FOR MACHINE TOOLS AND THE LIKE
Filed May 9, 1955 5 Sheets-Sheet 2

INVENTORS.
Kurt O. Tech
BY Herbert A. Martens
Harness, Dickey & Pierce
ATTORNEYS.

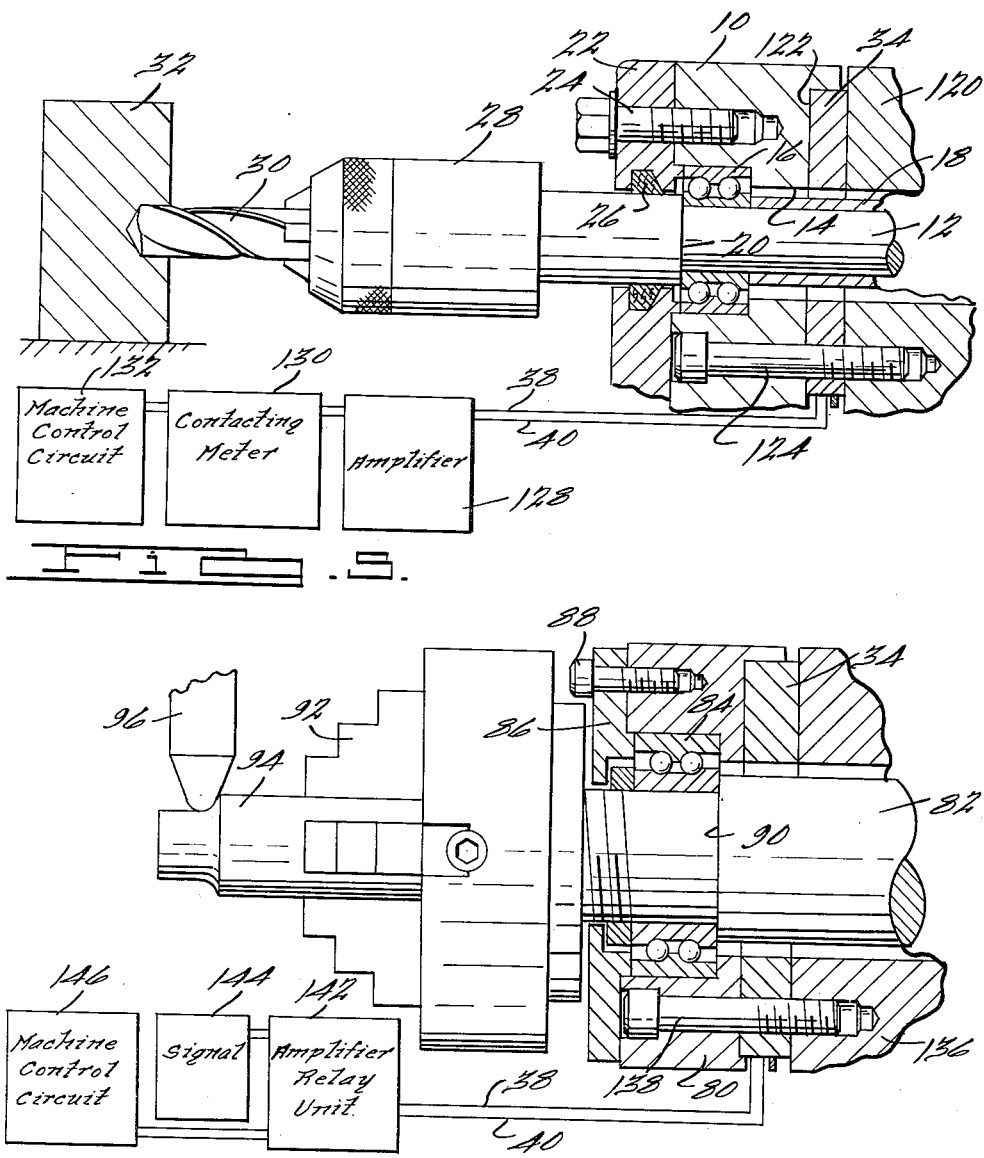

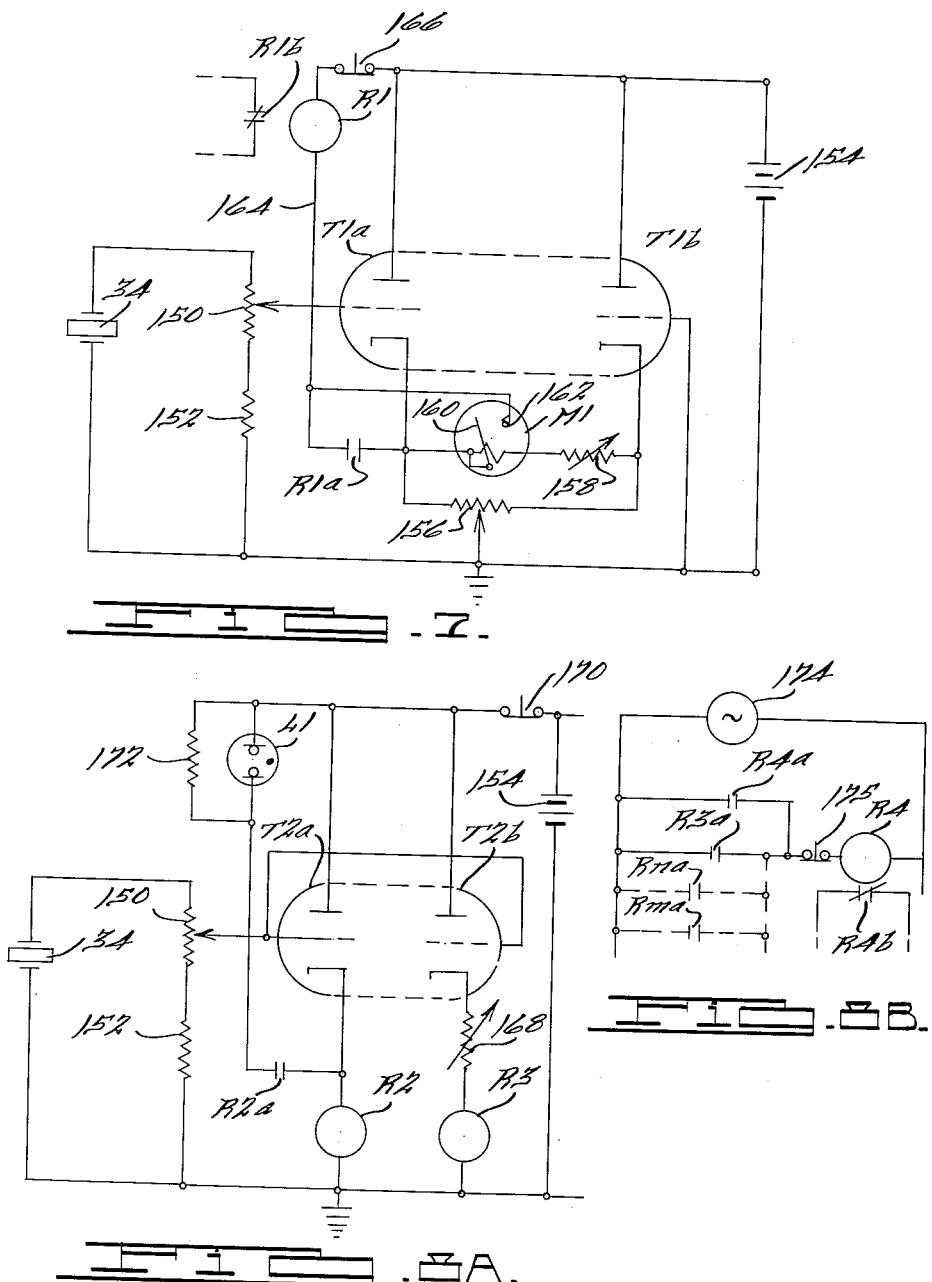

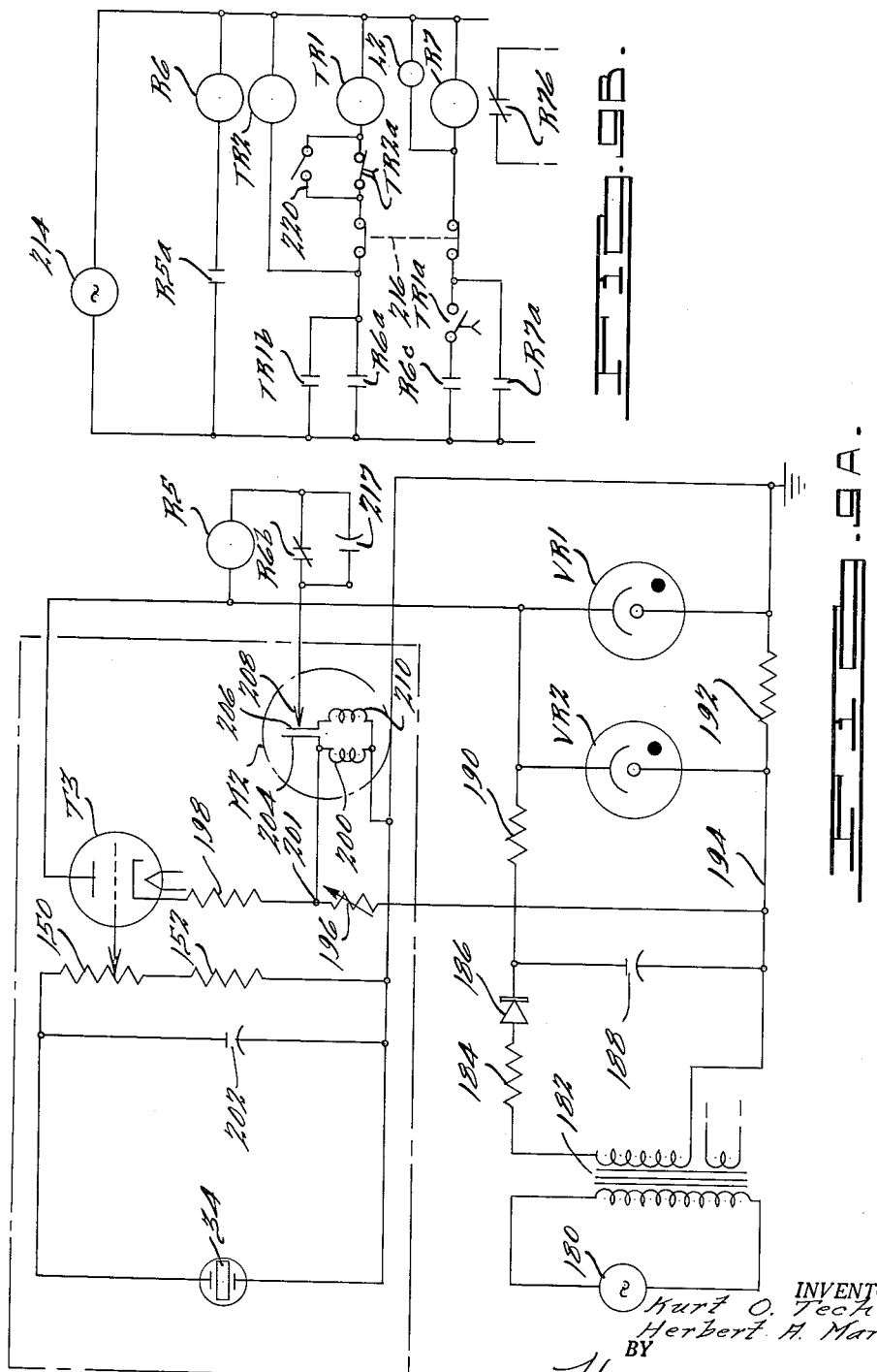

United States Patent Office 2,978,689
Patented Apr. 4, 1961

2,978,689
CONTROL MECHANISM FOR MACHINE TOOLS AND THE LIKE

Kurt O. Tech, East Detroit, and Herbert A. Martens, Birmingham, Mich., assignors to The Cross Company, Detroit, Mich., a corporation of Michigan Filed May 9, 1955, Ser. No. 507,008
21 Claims. (Cl. 340—222)

This invention relates to electrical apparatus for measuring the sharpness of cutting tools in a machine.

One of the most difficult things in establishing and maintaining an automatic or semiautomatic production line requiring the use of multiple machine tools is to keep all the tools adequately sharp so that they operate efficiently and thus are able to keep workpieces moving at maximum speed along the line without excessive tool breakage. When tools become dull more power is required to operate them and they tend to break easier.

Production lines of the type here under consideration require the use of many machines which perform different operations on the workpieces and which in many instances employ a large number of tools. Some of the tools can perform relatively few operations on the workpieces before they become so dull that they cannot perform their task without danger of breaking and before the power required to operate the machines begins to build up as a result of increasing tool dullness, whereas other tools can perform a relatively large number of operations on the workpieces before becoming dulled to this extent. Some individual machines having multiple heads may include tools whose life expectancy varies widely.

Each time a tool breaks, the machine and usually the entire production line must be shut down and the broken tool located and replaced. During this operation, production time is lost, resulting in the manufacture of fewer parts and a consequential increase in the cost of the unit produced. Further, if the broken tool is not discovered at once, the machine may be damaged and a number of production parts ruined. Most tool breakage is caused by operating the tool beyond its life expectancy and after it becomes excessively dull. The tools themselves are expensive, and excessive tool breakage is another factor that contributes to high production cost.

The importance of changing tools as soon as they become dull is thus apparent, and the difficulty of scheduling a production line employing many tools having widely varying life expectancies so as to maintain down time of the machines at a minimum and to keep the line in full production as much as possible is obvious. The important thing of course is to change the tools when they become dull, but it is difficult, in the environment pictured above, to determine exactly when each tool becomes so dull that it should be replaced and sharpened. If all the tools are replaced when they become dull or when they have less than a predetermined amount of useful life remaining, tool breakage and tool cost are reduced to a minimum, production time is increased and production costs are maintained at a minimum.

An important object of the present invention is to provide means for measuring the sharpness of a tool while the same is operating in a machine and for indicating when the tool becomes excessively dull.

Another object of the invention is to provide a means of the above-mentioned character that can be used with substantially any cutting tool.

Still another object of the invention is to provide means of the above-mentioned character that can be applied to a number of tools having different life expectancies and to a number of machines in a production line so as to keep the machine operator informed at all times concerning the sharpness of all the tools in all the machines in the line.

Yet another object of the invention is to provide an apparatus of the above-mentioned character that permits the operator to change the tools as they become dull so as to maintain the power requirements of the machines and tool breakage at a minimum and to enable the operator to schedule the machines so as to obtain maximum production time.

Another object of this invention is to provide apparatus of the above-mentioned character for automatically controlling machine tools.

A feature of this invention is a means for automatically stopping a machine when its cutting tool, or any one of its cutting tools, becomes dull.

Another feature of this invention is a means for energizing a signal or an alarm when a cutting tool attains a preselected degree of dullness.

Another feature of this invention is a means for indicating when a cutting tool has reached a certain preselected degree of dullness and for automatically terminating the operation of the machine with which the cutting tool is associated when the tool reaches a different preselected degree of dullness.

A further feature of this invention is a means for repetitively testing the sharpness of a cutting tool, and for terminating the operation of the machine with which the cutting tool is associated only when the tests have indicated a plurality of times that the cutting tool is dull, with further means being provided for terminating the operation of the machine only when the tests have indicated tool dullness on each of a plurality of successive cycles of machine operation.

Other objects, features and advantages of the invention will be apparent during the course of the following description.

In the drawings forming a part of this specification and wherein like numerals are employed to designate like parts throughout the same, Figure 1 is a side view showing parts in section and parts in elevation and illustrating one way of incorporating the instant invention in a drilling machine;

Fig. 5 is a representation of a modified form of the arrangement shown in Fig. 1 of the drawings, and includes a block-schematic representation of a modified electrical system which may be used in conjunction with any of the disclosed transducer arrangements;

Fig. 6 is a representation of a modified version of the arrangement shown in Fig. 3 of the drawings, and includes a block-schematic representation of a further modified electrical system which may be used in conjunction with any of the transducer arrangements disclosed;

Fig. 7 is a schematic representation of a circuit of the type represented in block schematic form in Fig. 5 of the drawings;

Figs. 8A and 8B are schematic representations of circuits of the type represented in block schematic form in Fig. 6 of the drawings; and Figs. 9A and 9B are schematic representations of a modified form of circuit of the type represented in block schematic form in Fig. 5 of the drawings.

This application is a continuation-in-part of our application Serial No. 423,952, filed April 19, 1954, now abandoned, bearing like title.

In connection with the foregoing, it should perhaps be pointed out that the invention is here shown associated with a drilling machine, a planer, a lathe, and a shaper primarily to demonstrate the adaptability and versatility of the invention. It is not limited to the particular machines shown but can be adapted to substantially any type of machine having a cutting tool. Wide diversification of use of the invention is contemplated.

Figure 1:
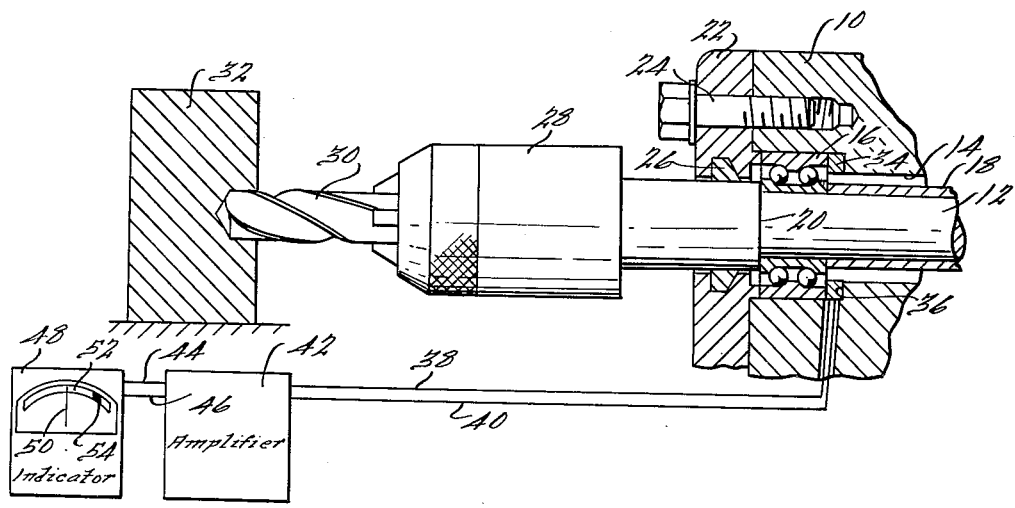

Reference is first had to Fig. 1 which shows the invention embodied in a drilling machine of more or less conventional construction and operation and including the usual spindlehead 10 and spindle 12. The spindle 12 extends through a longitudinal bore 14 in the head 10 and is supported for rotation at its forward end by a combination radial and thrust bearing 16. A sleeve 18 surrounding the spindle 12 butts against the inner race of the bearing 16 at the rear thereof, and a radial shoulder 20 on the spindle butts the inner race of the bearing at the front thereof. The outer race of the bearing 16 is held against forward movement by a bearing retainer 22 which is fastened to the head 10 by bolts 24. A seal 26 carried by the retainer 22 surrounds the spindle 12 to prevent lubricant supplied to the baring 16 from escaping forwardly along the spindle. A chuck 28 on the forward end of the spindle 12 carries a cutting tool here shown in the form of a drill 30.

In operation, the spindle 12 is rotatably driven by any suitable or conventional means (not shown), and the spindle head 10 is slidably actuated by other suitable conventional means (not shown) to move the rotatably driven tool 30 to and from a workpiece designated generally at 32. In conventional drilling machines, the spindlehead 10 and its adjuncts are part of a drill head, and the head normally is retracted to hold the tool 30 withdrawn from the work 32. After the workpiece 32 has been suitably positioned to be operated on by the tool 30, the latter is advanced to engage the work and simultaneously rotatably driven so that the tool drills a hole in the workpiece as shown in the drawing. After the drilling operation is completed, the head 10 is withdrawn to its initial position to complete the operation.

It is contemplated of course that the machine will operate on any kind of form of workpiece and that, if desired, conventional machanisms may be employed for moving a succession of workpieces automatically or semiautomatically into position in front of the machine for locating the work in proper relation with regard to the tool and for clamping it securely in the located position preparatory to and during the actual drilling operation.

It will be readily appreciated in connection with the foregoing that force must be applied to the spindlehead 10 in order to advance the tool 30 against the workpiece 32 and to force the tool into the work as the drilling operation proceeds. This pressure produces a reactive force rearwardly through the tool 30 and spindle 12 that varies directly with the sharpness of the tool. In other words, a given pressure on the head 10 produces a predetermined reactive force in the tool 30 and spindle 12 when the tool is sharp, and as the tool becomes dull in use the given forward pressure produces a progressively increasing reactive force in the tool and spindle. Thus, the reactive force produced in the spindle 12 during operation of the machine is a function of tool sharpness.

It is proposed, in accordance with the present invention, to mount a transducer at some point in the drive mechanism of the machine where it will be subjected to the reactive forces produced in the tool 30 or spindle 12 or some similarly coactive part. Force imposed on the transducer causes the latter to modify or generate an electric current that varies directly with the force applied to the transducer. This current can be measured and is an indication of the applied force. However, since the thrust or applied force varies with the sharpness of the tool 30, a measure of the current modified or generated by the transducer is also a measure of tool sharpness.

It has been found that the utilization of an electrical current in the manner described provides an accurate and practical means for measuring the sharpness of the tool 30 and conversely the extent to which it has become dull in use. Further, the measure of tool sharpness thus provided is sufficiently accurate to permit close control to be maintained at all times on the tools in a machine without actual physical inspection of the tools.

As a practical application of the invention the current can be utilized for operating an instrument that indicates the amount of current, and the indicating dial of the instrument can be calibrated in terms of tool sharpness to apprise the operator at all times as to the sharpness of the tool. Manifestly, if a transducer is associated with each tool of a machine or with each group of similar tools and the instruments operated by the electrical current flowing from the transducers are assembled in a single control panel, the machine operator is apprised at all times and at a glance as to the condition of the tools. The same thing of course can be done for a line of machines on a production line, and the operator is then apprised as to the condition of all the tools of all the machines on the line. Further, by placing suitable indicia on the calibrated dials of the instruments, the operator can be informed when any tool has become so dull that it should be replaced or when a tool has become so dull that less than a predetermined interval in terms of machine operation remains of the life of the tool. Thus, when the machine is shut down for a tool change, the operator can change not only the tool which caused the shutdown but also any tools that may cause the machine to shut down too soon after the machine is again started in operation. In this manner, the operator is reasonably assured of continuous machine operation for at least the predetermined time before it is again necessary to shut the machine down for a tool change. Of course, if desired, the current modified or generated by the transducers can be used in other ways as, for example, to open a switch or other control device in the operating circuit of the machine or in the master circuit of the production line so that the machine and/or the line shuts down automatically whenever any tool requires changing. Utilization of the invention in this manner is contemplated and within the scope of the invention. The operating principles disclosed in copending application Serial No. 162,176 which was filed in the Patent Office on the sixteenth day of May 1950, and matured into Patent No. 2,679,038 on the 18th day of May 1954, can be utilized to control the machine or production line in the manner described.

In the particular machine here shown by way of illustration (Fig. 1), a transducer 34 is interposed between an internal radial shoulder 36 in the spindlehead 10 and the outer race of the thrust bearing 16. Thus, reactive forces produced in the drive shaft 12 in operation of the machine are transferred to the bearing from the radial shoulder 20 and thence through the outer race of the bearing to the transducer 34. As suggested, the pressure imposed on the transducer 34 varies directly with the reactive force produced in the drive shaft 12. Any of a number of known commercially available transducers can be used for this purpose, ceramic transducers being a typical example.

Current generated or modified by the transducer 34 as a result of pressure imposed thereon in the manner hereinabove described travels along electrical conductors 38 and 40 to an amplifier 42. Any suitable or conventional amplifier can be used, and suitable amplifiers are readily available on the market. The amplified current flows from the output connections of the amplifier 42 through conductors 44 and 46 to an instrument 48 here shown in the form of a conventional dial indicator having a pointer 50 arranged to traverse a scale 52. The pointer 50 moves progressively to the right on the scale 52 as the current supplied thereto through conductors 44 and 46 increases and, as suggested, the current increases gradually as the tool 30 becomes duller. Suitable indicia such as the mark 54 can be provided on the scale 52 to apprise the operator when the tool has become so dull as to require changing.

Figure 2:
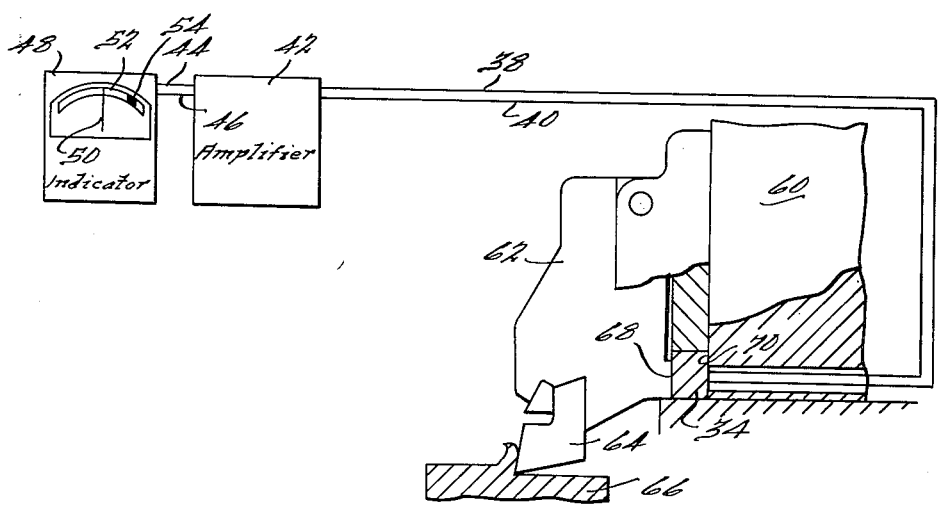
Fig. 2 is a view similar to Fig. 1 but showing the invention incorporated in a planer.

Attention is now directed to Fig. 2 which shows the invention embodied in a planer. In this machine the tool of course is not rotated as in a drilling machine and the operation performed merely involves traversing the work relative to the cutting tool. The drawing shows only a fragmentary portion of a conventional planer including a machine head 60 having a pivoted toolholder 62 which carries a cutting tool 64. In use, a workpiece 66 is advanced against the tool 64 and the cutting edge of the tool removes a shaving or strip of metal from the work.

As the work 66 moves against the tool 64, the head 62 seats rearwardly against the forward surface 68 of the transducer 34 which in this instance is interposed between the head 62 and a fixed reference surface 70 on the head 60. In this situation the transducer 34 and its adjuncts are identical to the corresponding parts shown and described in connection with the first form of the invention (Fig. 1) and the same reference numerals are therefore applied to the corresponding parts. As in the first form of the invention, pressure applied by the holder 62 against the transducer 34 increases progressively as the tool 64 becomes dull, and the increasing pressure against the transducer 34 causes a corresponding change in the current generated or modified by the transducer so that the indicator 48 which measures the amount of current in the circuit apprises the operator of the condition of the tool 64.

Figure 3:
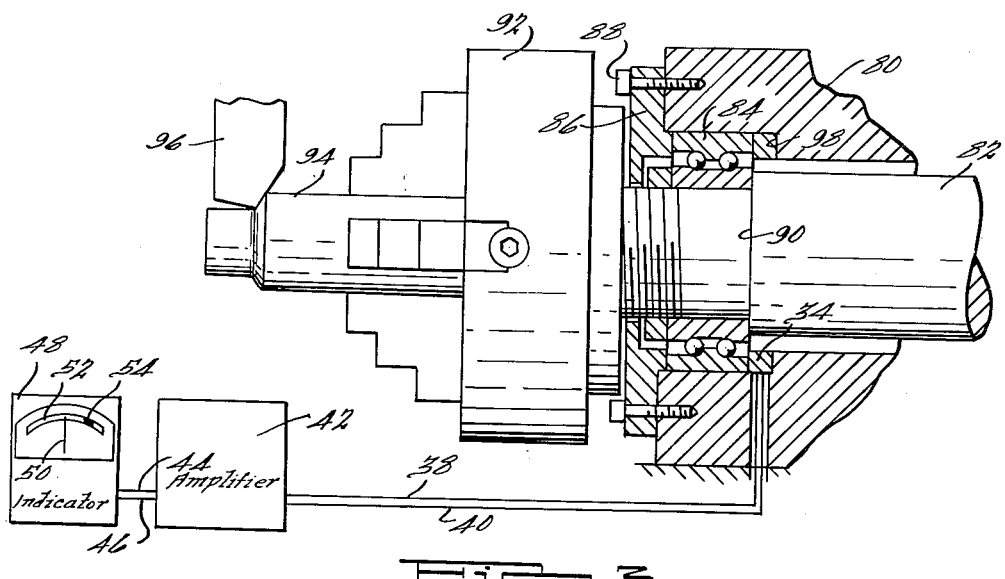
Fig. 3 is a view similar to Fig. 1 but illustrating the invention incorporated in a lathe.

Fig. 3 shows the invention incorporated in a conventional lathe which performs an operation in which the work is rotated while a cutting tool is engaged therewith. The portion of the lathe here shown has a spindle head 80 and a drive shaft 82 in the spindle supported for rotation at the forward end thereof by a combination radial and thrust bearing 84. A bearing retainer 86 fastened to the spindle by screws 88 engages the bearing 84 to hold the latter against forward displacement in the head 80. The inner race of the bearing 84 preferably fits the shaft 82 relatively snugly and a radial shoulder 90 seats forwardly against the race. A chuck 92 on the forward end of the drive shaft 82 is adapted to clamp a workpiece 94 in the conventional manner.

In use, the drive shaft 82 is rotatably driven to rotate the workpiece 94, and a tool 96 is moved simultaneously axially against the rotatably driven work as shown in the drawing. The general construction and operation of this machine is conventional and well known, and further explanation therefore is deemed unnecessary.

As in the case of the drilling machine (Fig. 1), a transducer 34 is interposed between the bearing 84 and a radial surface 98 in the spindle head 80 which corresponds to the surface 36 in the drilling machine. The transducer 34 and its adjuncts function in the same manner in the lathe as in the drilling machine to accomplish substantially the same results, and further or a more detailed description therefore appears unnecessary.

Figure 4:
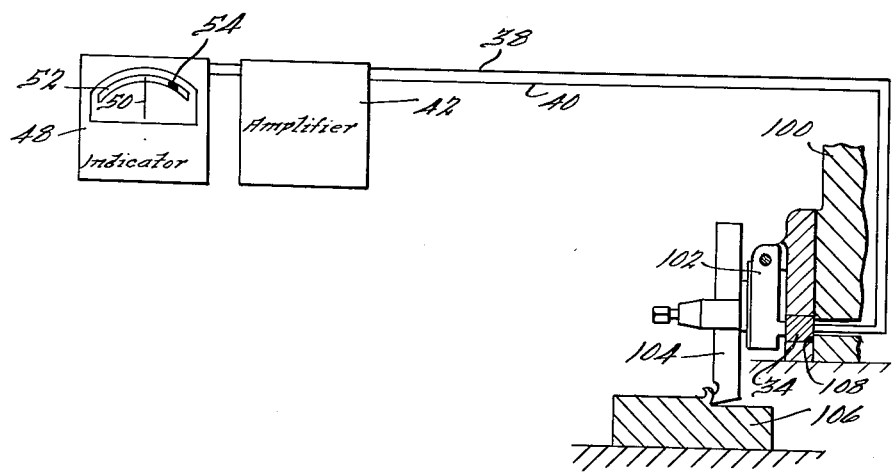
Fig. 4 is a view similar to Fig. 1 but illustrating the invention incorporated in a shaper.

Fig. 4 illustrates the invention embodied in a shaper. The shaper here shown is of conventional construction and includes a machine head 100 having a pivoted work holder 102 which carries a cutting tool 104. In this case the head 100 is reciprocated to move the cutting tool 104 against a stationary workpiece 106 and the pivoted toolholder 102 acts against a transducer 34 supported on a suitable reference surface 108 during operation of the machine to generate or modify a current for operating an indicator or other instrumentality as in the forms of the invention hereinabove described. The construction and operation of planers are well known; and since the apparatus shown functions in the same manner as the apparatus hereinabove described to apprise the operator of the relative sharpness of the tool 104, further explanation is deemed unnecessary.

It will be seen at this point that we have achieved certain of the objects of our invention. We have provided a novel and efficient way of keeping simultaneous account of a large number of tools and of doing this in such a way as to apprise the operator relatively exactly as to the sharpness of all the tools under his supervision. The apparatus is uniquely adapted to measure the sharpness characteristics of the tools directly and to utilize information developed by the apparatus in a practical and efficient manner to increase the operating efficiency of a production line, to maintain the power requirements of the machines in the line at a minimum, and to keep production costs essentially low.

In the examples of Figs. 2 and 4 of the drawings, wherein the work and the tool reciprocate relative to each other, the reactive force applied to the transducer 34 is substantially pure thrust. However, in the examples of Figs. 1 and 3, wherein the work and tool also rotate relative to each other, the placement of the transducer element 34 in the shown position in abutment with the outer race of the bearings 16 or 84, respectively, may result in the application to the transducer element 34 of other reactive forces.

An accurate indication may best be obtained if only pure thrust is measured, i.e., if the only forces which are applied to the transducer element 34 are those parallel to the longitudinal axis of the spindle 12 (Fig. 1) or drive shaft 82 (Fig. 3). Thus, it is desirable that all of the reactive thrust be applied normal to the front face of the transducer 34 as a compressive force, but that all other force components and moments be ineffective to control or modify the compressive forces acting upon the transducer element.

The drilling machine of Fig. 1 of the drawings may be modified to insure that only pure thrust is applied to the transducer 34 in the manner shown in Fig. 5 of the drawings. In this view, the parts are generally identical to those represented in Fig. 1, and corresponding reference characters are applied thereto. The difference lies in the interposition of the transducer 34 between two spindlehead portions: a forward portion 10 and a rear portion 120.

The annular transducer 34 is disposed in a cavity 122 bored or otherwise formed in the rear face of the spindlehead forward portion 10, the depth of that cavity 122 being less than the thickness of the annular transducer 34. The rearmost face of the transducer 34 abuts the forward face of the rear portion 120. The forward spindlehead portion 10 and the rear portion 120 are interjoined by a plurality of machine screws 124 the unthreaded shanks of which engage bores in the portion 10 and the threaded ends of which engage tapped holes in the portion 120. The transducer 34 is suitably apertured to pass the machine screws 124, but it does not engage them.

Pure reactive forces, directed parallel to the longitudinal axis of the spindle 12 and transmitted through the thrust bearing 16 and the spindlehead portion 10, can be transmitted to the rear portion 120 only through the transducer 34 inasmuch as the machine screws 124 are not effective to serve as transmitting agents for these forces. This pure thrust acts in compression upon the transducer 34. As a result, transducer 34 produces a voltage the amplitude of which is a function of the amplitude of the forces exerted normal to its faces. However, all other force components and moments transmitted through the spindle 12 are transmitted to the body 120 through the machine screws 124 and do not tend to compress, distort or otherwise affect the transducer 34.

The output indication produced by the transducer 34 may be applied to a pair of conductors 38 and 40 and through an amplifier 128 and be employed to deflect a contacting meter 130, the nature of which will be described hereinafter. The contacting meter 130 may, in turn, be employed to actuate a machine control circuit 132 in a manner hereinafter to be described.

The lathe represented in Fig. 3 of the drawings may be similarly modified as represented in Fig. 6 of the drawings, to insure that only pure thrust is applied to the transducer 34. Again, the parts are generally similar and corresponding reference characters are applied thereto. The modified form differs primarily in that the transducer 34 has been separated from the combined radial and thrust bearing 84 and interposed the two spindle-head portions 80 and 136. Portions 80 and 136 are rigidly interjoined by machine screws 138 which are effective to prevent all relative motion between the portions 80 and 136 except motion of those portions towards each other. Thus, all of the pure reactive thrust is transmitted from the portion 80 to the portion 136 through the transducer 34, but no other force components or moments are transmitted between those portions by the transducer 34.

Exemplarily, the output conductors 38 and 40 from the transducer 34 are connected to an amplifier relay unit 142 which is effective to energize a signal 144 under preselected conditions and which is effective to energize a machine control circuit 146 under the same or different preselected conditions, as will be described hereinafter.

It should be recognized that the control system represented by rectangles 128, 130 and 132 in Fig. 5 of the drawings, representative details of which are presented in Figs. 7, 9A and 9B of the drawings, and the control system represented by rectangles 142, 144 and 146 in Fig. 6 of the drawings, representative details of which are presented in Figs. 8A and 8B of the drawings, are not peculiarly adapted to the tool with which they are shown to be associated, and each system is to be considered to be generally adapted for utilization with any type of cutting tool so long as it is possible to associate with it a transducer capable of measuring a preselected critical reactive force indicative of the state or condition of that cutting tool.

The control system represented in Fig. 7 of the drawings is adapted to respond to the output of the transducer 34 to control a set of contacts R1b which may be arranged to stop, or otherwise control, the machine tool with which the particular cutting tool is associated. In this circuit drawing, as in the others, an electromagnetic relay is designated by a circle identified by a capital R followed by a distinguishing number, and the electrical contacts controlled by that relay are referenced by a reference character identical to that of the relays but followed by a lower-case distinguishing letter. A set of contacts which is open when the relay is de-energized and closed when the relay is energized, frequently referred to as "front" contacts, are represented by a pair of spaced-apart parallel lines, and a set of contacts which are closed when the relay is de-energized and opened when the relay is energized, frequently referred to as "back" contacts, are represented by a pair of spaced-apart parallel lines bridged with an oblique line. To insure clarity, a capacitor is represented by a spaced-apart straight and curved line. This symbolism is conventional in the machine-control art to which this invention relates.

The output voltage produced by the transducer 34 is applied across the serially interconnected potentiometer 150 and resistor 152, with the wiper of potentiometer 150 connected to the control grid of a triode T1a. For purposes of analysis, the transducer 34 may be considered to act, with varying applied forces, as a capacitor having a high value of resistance connected across a high-impedance voltage source. Hence, the functional relationship of the triode's input voltage to the force applied to transducer 34, as that force varies with time, will be determined in part by the value of resistor 152 and the value of the resistive element of potentiometer 150. The controlling time constant of the system, therefore, is effectively equal to the effective capacitance of the transducer 34 multiplied by the sum of its internal resistance the resistance of potentiometer 150 and the resistance of resistor 152. This time constant has significance only to the extent that it is related to the rate of applied-force variation, i.e. in the system to which the invention relates, to the cycle-repetition rate of the machine tool, or, more particularly, to the cycle repetition rate of the cutting tool with which the transducer 34 is associated.

The internal resistance of the transducer 34 is sufficiently high so that if resistor 152 is made very large, e.g., approaching infinity, the voltage decay time of the transducer 34 is adequately large relative to the cycle repitition rate of the machine tool so that the voltage applied to the control grid of triode T1a is effectively continuously a direct function of the force applied to the transducer 34. If, on the other hand, the value of resistor 152 is appropriately reduced, voltage pulses are produced at the control grid of triode T1a with changes in the force applied to transducer 34. Obviously, the value of resistor 152 may be made sufficiently small (although it will still have a high value of resistance under conventional standards) so that differentiation occurs, wherein the amplitude of the voltage applied to the control grid of triode T1a will vary as a function of the changes in the force applied to the transducer 34. For purposes of explanation, it will be assumed that the value of resistor 152, the value of the resistive element of potentiometer 150, and the characteristics of transducer 34 are such that the total time constant is in the order of two seconds, which is assumed to be small relative to the cycle repetition rate of the machine tool, and that, as a consequence, pulses are applied to amplifier T1a. In the disclosed arrangement, an increase in the force applied to the transducer 34 will produce a positive-going voltage signal at the control grid of triode T1a.

Triodes T1a and T1b are connected in parallel across a voltage source 154, the anodes of both triodes being connected directly to the positive terminal of that source, and the loads being in the cathode circuits. Hence, both tubes T1a and T1b operate as cathode followers, having a high-impedance input and a low-impedance output. Thus, while the tube circuits are herein broadly termed amplifiers, their voltage gain may be less than 1, and they may primarily serve an impedance-transforming function.

The cathodes of both triodes are connected to the grounded side of the source 154 through a balancing potentiometer 156, and the control grid of the right-hand triode T1b is directly grounded. A sensitive, contact-making type of galvanometer (which may be provided with a peak-reading hand) is serially connected with a variable resistor 158 between the cathodes of the two triodes T1a and T1b. The system therefore may be made to operate in the nature of a bridge, with potentiometer 156 being varied to establish static or zero-signal voltage balance. The voltage difference between the cathodes of tubes T1a and T1b will vary as a function of the amplitude of the input signal, and this differential voltage will produce a current through the winding of meter M1 to produce a corresponding deflection of its indicator needle 160.

In accordance with the foregoing teachings, it will be appreciated that the maximum deflection of the needle 160 during any given operation of the cutting tool with which the transducer 34 is associated may be considered to represent the instant condition of the cutting tool. When the cutting tool reaches a preselected degree of dullness, with a consequent increase in the reactive force applied to the transducer 34, the indicating needle 160 will engage its contact 162 to complete a circuit, including conductor 164, the winding of relay R1, reset switch 166, and the voltage source 154, to operate relay R1. Relay R1, in operating, holds itself energized over a circuit from the source 154, reset switch 166, its winding, conductor 164, its front contacts R1a, potentiometer 156 and back to the source 154. Relay R1, in operating, also opens its normally closed contacts R1b to control the operation of the machine tool in a manner apparent to those skilled in the art to which this invention pertains.

The circuits will remain in this condition until such time as reset switch 166 is momentarily operated, at which time relay R1 will become de-energized and the system will again be in condition to perform its functions. Of course, if meter M1 is of the locking type, a reset mechanism associated therewith must be operated to release the indicator 160 from its contact 162.

The input circuit to the system represented in Fig. 8A of the drawings is identical to that represented in Fig. 7, and similar reference characters have been applied. However, in this system, cathode followers T2a and T2b are not connected in bridge relationship and the system otherwise differs from the system of Fig. 7 primarily in containing provision for energizing a signal light L1 when a force of a certain preselected amplitude is applied to the transducer 34 (Fig. 8B) when a force of a preferably different preselected amplitude is applied to transducer 34. Thus, the system of Figs. 8A and 8B is generally represented in block schematic form in Fig. 6 of the drawings, with the amplifier relay unit 142 comprising tubes T2a and T2b and relays R2 and R3, with the signal light unit 144 comprising lamp L1 and with the machine control circuit 146 comprising relay R4.

The input voltage pulse is applied in parallel to triodes T2a and T2b. The anodes of both triodes are connected to the positive terminal of the voltage source 154, the cathode of triode T2a is connected to ground through the winding of relay R2, and the cathode of triode T2b is connected to ground through variable resistor 168 and the winding of relay R3. It is contemplated that the parameters be so arranged that relay R2 will be operated when the cutting tool reaches a preselected degree of dullness which is less than that amount of dullness which will necessitate its replacement whereas relay R3 will not operate until such time as the cutting tool is sufficiently dull to necessitate replacement. Thus, when the machine process line is shut down to permit the replacement of any cutting tool therein which has become dull and which has therefore produced the operation of the relay R3 individual thereto, the operator may scan the lamps L1 associated with all of the other cutting tools on the line to perceive if any of those other cutting tools are approaching the degree of dullness necessitating replacement. Those cutting tools may then be prematurely replaced to avoid having to again shut the line down in a relatively short time.

When the voltage pulse applied to tubes T2a and T2b (Fig. 8A) reaches an amplitude indicative of a preselected incipient degree of dullness of the cutting tool, the current through triode T2a will be adequate to operate relay R2. Relay R2, in operating, closes its contacts R2a to complete a circuit from the source 154, reset switch 170, through neon diode L1 in parallel with resistor 172, contacts R2a and the winding of relay R2 to ground whereby diode L1 is caused visibly to glow. This condition will continue through succeeding operations of the cutting tool until its degree of dullness becomes such that the amplitude of the input pulse to triode T2b is adequate to produce sufficient current to operate relay R3. Relay R3, in operating, closes its contacts R3a (Fig. 8B) to complete a circuit from an appropriate source of potential 174, exemplarily shown to be an alternating-voltage source, through those contacts R3a, through reset switch 175, and through the winding of relay R4, resulting in the energization and operation of relay R4. Relay R4, in operating, closes contacts R4a to complete a holding circuit for itself, and opens its contacts R4b to produce the requisite control of the machine tool, e.g., cessation of the operation of the machine tool.

Contacts Rna and Rma are intended to represent contacts of relays correlative to relay R3 in other control circuits of the type shown in Figs. 8A and 8B, to illustrate that relay R4 may be shared in common by a number of such circuits.

The operation of relay R3 is, of course, momentary in the disclosed arrangement. When reset switch 170 is momentarily depressed, relay R2 releases to extinguish diode L1 and when reset switch 175 is momentarily depressed, relay R4 is released, thereby to restore the circuits to normal in preparation for further functioning.

The system disclosed in Figs. 9A and 9B of the drawings differs from those previously described primarily in that it is adapted to produce an output indication of tool dullness only in response to the receipt of a plurality of input indications of tool dullness. When the cutting operations are being performed on materials which may occasionally be non-homogeneous, such as iron castings, an improper indication of tool dullness may occasionally be obtained as the result of a tool striking a hard spot in the workpiece. When the tool strikes such a hard spot, the reactive forces increase substantially, producing an indication of tool dullness even though the tool may in fact be sharp.

The system of Figs. 9A and 9B is not only adapted to produce its ultimate output signal only after the receipt of a plurality, exemplarily two, of input indications of tool dullness, but it may also be arranged so as to impose the further requirement that the second indication of tool dullness must occur within a preselected short interval of time after the first indication. By selecting this interval in the light of the cycle repetition rate of the machine with which the cutting tool is associated, an indication of tool dullness will be provided at the output of the electrical system only when the tool is in fact dull or when hard spots are hit by the cutting tool on two successive castings. If the nature of the material in the workpieces is such that it is not improbable that the cutting tool will strike hard spots on two successive castings, then provision may readily be made, in accordance with the teachings of the invention, that the second, third, or any other number of initial input indications of tool dullness may be disregarded.

A regulated voltage supply is exemplarily shown in Fig. 9A. A source of line voltage 180 is applied to the primary winding of an isolation transformer 182. The alternating voltage appearing across the secondary winding of transformer 182 is applied across the serially interconnected resistor 184, rectifier 186 (exemplarily shown to be of the dry-disc type), and capacitor 188. The resultant rectified voltage appearing across capacitor 188 is applied across the serially interconnected resistor 190, cold-cathode gaseous-discharge voltage-regulating diode VR1, and resistor 192. Since the junction between diode VR1 and resistor 192 is grounded, a voltage positive with respect to ground by an amount equal to the drop across tube VR1 is applied to the anode of triode T3 which is connected as a cathode follower.

The voltage appearing across capacitor 188 is also applied across resistor 190 and voltage-regulating diode VR2. Diode VR2 preferably has a greater operating voltage than tube VR1, and as a consequence conductor 194 is maintained at a voltage negative with respect to ground by an amount equal to the voltage drop across resistor 192, that is, by an amount equal to the difference in operating voltages between tubes VR2 and VR1. As an example, tube VR1 may be an OC3 whereby the anode of tube T3 is held about 105 volts positive with respect to ground, and tube VR2 may be an OD3 whereby conductor 194 is held about 45 volts negative with respect to ground. The voltage on conductor 194 is applied to the cathode of triode T3 through a variable resistor 196 and resistor 198. The signal winding 200 of a meter M2 is connected between ground and a point 201 intermediate resistors 196 and 198. By appropriately adjusting resistor 196, the voltage at point 201 may be adjusted to ground level under zero-signal conditions so that, under those conditions, no current will flow through winding 200.

The input circuit of triode T3 is similar to that of the previously described circuits, and includes a potentiometer 150 and a grid-return resistor 152. A capacitor 202 is connected across the input to bypass stray alternating-current pick-up by the lines. A positive voltage pulse applied to the grid of triode T3 will produce an increase in the plate current, with a resultant rise in the voltage across resistor 196 and a consequent increase in the current through signal winding 200 of the meter M2. Meter M2, as well as meter M1 in the circuit of Fig. 7, may be of the peak-reading type, being provided with a peak-reading hand (not shown) actuated by the moving indicator needle 204 and retained by friction at a point to provide a semi-permanent indication of the maximum current through the meter and hence of the maximum force applied to the transducer 34.

The indicator needle 204 will be deflected each cycle of operation in accordance with the amplitude of the reactive force. When the reactive force becomes sufficiently great to produce adequate current through signal winding 200 of the meter M2, the indicating needle 204 will engage a contact arm 206 and force it into at least momentary engagement with contact 208. With the arrangement shown, at the instant of engagement between the indicating needle 204 and the contact arm 206, contact winding 210 is placed in parallel with the signal winding 200, producing an additional torque tending to force arm 206 into engagement with contact 208. When this contact is closed, a circuit is established from the positive potential at the anode of diode VR1, winding of relay R5, normally closed contacts R6b, contact 208, contact arm 206, contact winding 210 and to ground whereby contact arm 206 is effectively locked in engagement with contact 208 and whereby relay R5 is operated.

Relay R5, in operating, closes its normally open contacts R5a (Fig. 9B) to complete a circuit from a suitable source of potential 214, representatively shown as an alternating-current source, through contacts R5a and through the winding of relay R6, whereby relay R6 is operated. Relay R6, in operating, closes its contacts R6a to complete a circuit from source 216, through those contacts, reset switch 216, normally closed (or bypassed) contact TR2a, and through the winding of an electromagnetically controlled timer TR1. Timer TR1, when energized, immediately closes its contacts TR1b to establish a holding circuit for itself through the reset switch 216. Relay R6, in operating, also closes its contacts R6c so that a circuit can be established to energize relay R7 when timer TR1 closes its contacts TR1a.

However, timer TR1 will not close its contacts TR1a until a preselected time interval has elapsed and prior to the end of this time interval, contacts R6c are opened to disable this energizing circuit for relay R7. Thus, when relay R6 operated, it opened its contacts R6b so that after a slight delay established by the discharging of capacitor 217, connected in shunt of contacts R6b, relay R5 is released and contact winding 210 of meter M2 is de-energized. The release of relay R5 results in the opening of contacts R5a, with a resultant de-energization of relay R6 so that contacts R6a and R6c are opened. The opening of contacts R6a is without present significance since timer TR1 is held operated as noted. The opening of contacts R6c will, however, disable the energizing circuit for relay R7 so that relay R7 will not operate even though timer TR1 closes its contacts TR1a at the end of the aforesaid preselected time interval.

When the contact winding 210 of the meter M2 is de-energized, the contact needle 206 separates from the contact 208. It will be noted that the indicator needle 204 will not be in a position to retain contact arm 206 in engagement with contact 208 since the input pulse will have become attenuated.

The next step in the system's functioning will be determined by whether switch 220, shunting contacts TR2a, is open or closed. If closed, the system will produce its ultimate output indication upon the next closure of contact arm 206 with contact 208 regardless of the time lapse or the number of intervening cycles of machine operation. Assuming switch 220 to be closed, the system will remain in the described condition, with contacts TR1a closing after the prescribed selected interval, until such time as a second input pulse is applied to triode T3 of sufficient amplitude to again cause the indicating needle 204 of meter M2 to move contact arm 206 into engagement with contact 208, to again energize the winding 210 of meter M2 and operate relay R5 through the now closed contacts R6b. As a result, relay R6 is again operated to again close its contacts R6c. Since contacts TR1a are now closed, this second closure of contacts R6c will complete the energizing circuits for relay R7 and for lamp L2, which is connected in parallel with the winding of relay R7. Relay R7, in operating, closes its contacts R7a to complete a holding circuit for itself and for lamp L2, that holding circuit and the holding circuit for timer TR1 being controlled by reset switch 216. Relay R7 will also open its contacts R7b appropriately to control the machine tool, e.g., to terminate the operation of the machine tool.

It will be observed that when the production line is shut down as a result of the determination that any cutting tool therein is sufficiently dull to necessitate replacement, the operator may view the position of the peak-reading hands of all of the meters M2 associated with all of the cutting tools to determine whether any of the other cutting tools are so closely approaching dullness as to merit their immediate replacement.

After the tools are changed, the peak-reading hands of all meters are mechanically returned to zero by means of knobs or levers on the meters, and the reset switch 216 is momentarily depressed. When switch 216 is opened, timer TR1, relay R7 and lamp L2 are deenergized. Since relays R5 and R6 are released in the previously described manner, the system is restored to normal in preparation for further functioning.

The system of Figs. 9A and 9B as thus far described is designed to respond only to the second indication, whenever it occurs, that the cutting tool with which it is associated is dull. It is obvious that the system may be expanded so that it is only the third or fourth or greater repetition of the indication that causes the line to be shut down so as to reduce the possibility of the indication of dullness arising solely from the repetitive striking of hard spots in the castings.

If switch 220 is moved to its open position, the functioning of the system is modified to the extent that if an indication of tool dullness is not obtained on, for example, two successive operational cycles, the apparatus will be completely restored to normal, with no retention of the prior dullness indication. Thus, the possibility of improper line shutdown, due to an improper indication of tool dullness, can be reduced if the condition precedent to shutdown is the repetition of the indication on two successive operational cycles over what it is if the only condition precedent to line shutdown is the receipt of two indications of tool dullness regardless of the number of operational cycles that occurs between those indications.

With switch 220 opened, timer TR2 (Fig. 9B) is effective to control timer TR1. Timer TR1 is set, as an example, to delay the closure of its contacts TR1a for an interval just slightly greater than the total period of operation of relay R6, and timer TR2 is set to delay the opening of its contacts TR2a for an interval just slightly greater than the period of the machine's operational cycle. At the first indication of tool dullness, the system operates as just described, with relays R5 and R6 operating and releasing and with timer TR1 being energized immediately to close its contacts TR1b and to close its contacts TR1a shortly after relay R6 has released. However, with switch 220 open, the normally closed contacts TR2a of timer TR2 are effective to control the holding circuit for timer TR1. Since contacts TR2a are normally closed, the winding of timer TR2 is effectively in parallel with timer TR1 and the two are concurrently energized.

If a repeated indication of tool dullness is received on the next succeeding cycle of operation of the machine, relay R7 will be operated as before noted. If, however, no such indication is then received, timer TR2 will open its contacts TR2a to de-energize timer TR1, which will open its contacts TR1b to de-energize timer TR2 and will open its contacts TR1a. Hence, the system is restored fully to normal. Whenever two successive indications of tool dullness are received and relay R7 is operated, timer TR1 will be de-energized when timer TR2 opens its contacts TR2a, and timer TR2 will be de-energized when contacts R6a open, but relay R7 and lamp L2 will remain energized until reset switch 216 is momentarily depressed.

It will be observed that the delay period of timer TR2 may be increased to provide for machine shutdown if an indication of tool dullness is obtained on any two of a selected plurality of cycles of machine operation, and that the shown arrangement may readily be expanded to establish any other preselected conditions precedent to machine shutdown.

While it will be apparent that the embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. In a machine, an apertured first portion, a shaft, bearing means within the aperture in said first portion and supporting said shaft for rotational motion relative to said first portion, a second portion apertured to accept said shaft and spaced from said first portion, fastening means fixing said first portion against rotational motion relative to said second portion, and a transducer element interposed and clamped between said first and second portions, and means for maintaining a constant preload pressure on said transducer element.

2. In a machine, an apertured first portion, a shaft, bearing means within the aperture in said first portion and supporting said shaft for rotational motion relative to said first portion, a second portion apertured to accept said shaft and spaced from said first portion, fastening means fixing said first portion against rotational motion relative to said second portion, and a transducer element interposed between said first and second portions and apertured to accept said shaft, all portions of said transducer being spaced from said shaft.

3. In a machine, an apertured first portion, a shaft, bearing means within the aperture in said first portion and supporting said shaft for both translational and rotational motion relative to said first portion, a second portion apertured to accept said shaft and spaced from said first portion, fastening means fixing said first portion against rotational motion relative to said second portion but permitting said first portion to move in translation relative to said second portion in a direction parallel with the axis of said shaft, and a transducer element interposed between said first and second portions and clamped at a constant uniform preload pressure between said first and second portions by said fastening means.

4. In a machine, an apertured first portion, a shaft, bearing means within the aperture in said first portion and supporting said shaft for rotational motion relative to said first portion, support means adapted to hold a workpiece, a second portion apertured to accept said shaft and spaced from said first portion and fixed against movement in translation relative to said support means, fastening means fixing said first portion against rotational motion relative to said second portion, and a transducer element interposed between said first and second portions and clamped at a constant uniform preload pressure between said first and second portions by said fastening means.

5. In a machine for producing an indication of the thrust exerted through and along the longitudinal axis of a shaft, an apertured first body portion, an apertured second body portion, a transducer element disposed between said body portions, a shaft disposed within the apertures in said body portions, said transducer being apertured and surrounding but spaced from said shaft, bearing means within the aperture in said first body portion for supporting said shaft for rotational motion relative to said first body portion, means including said bearing means for holding said spindle and said first body portion against translational motion relative to one another, and means independent of said transducer for holding said body portions against rotational motion relative to one another.

6. In a machine having a rotatable shaft, means for producing an indication of thrust exerted through and along said shaft comprising a transducer adjacent to said shaft, two relatively spaced parts confining said transducer therebetween, a bearing in one of said parts supporting said shaft for rotation, means acting through said bearing for pressing said transducer between said parts to exert a constant predetermined preload pressure on the transducer, and means coactive with said shaft and one of said parts also acting through said bearing to impose on the transducer additional pressure which is a function of the thrust exerted through and along said shaft.

7. In a machine having a rotatable shaft, means for producing an indication of thrust exerted through and along said shaft comprising a spindle head receiving said shaft, a bearing having an outer race received by said spindle head and an inner race surrounding said shaft and supporting the latter for rotation in said spindle head, a transducer confined between the outer race of said bearing and a radial shoulder in said spindle head, a bearing retainer connected to said spindle head bearing on the outer race of the bearing to press the latter against said transducer with a constant predetermined preload pressure, and means associated with said shaft also acting through said bearing to impose on the transducer additional thrust pressure which is a function of the thrust exerted through and along said shaft.

8. In a machine having a rotatable shaft, means for producing an indication of thrust exerted through and along said shaft comprising a transducer adjacent to said shaft, two relatively spaced parts confining said transducer therebetween, a bearing in one of said parts supporting said shaft for rotation, means acting through said bearing for pressing said transducer between said parts to exert a constant predetermined preload pressure on the transducer, and means forming a shoulder on said shaft engaging said bearing and operative to transmit thrust exerted along said shaft through the bearing and against said transducer, said thrust augmenting said preload pressure constantly imposed on said transducer.

9. In a machine having a rotatable shaft, a spindle head receiving said shaft having relatively spaced front and rear portions, a transducer confined between the front and rear portions of said spindle head, means interconnecting the front and rear portions of said spindle head to draw the same together and against said transducer whereby to exert a constant predetermined preload pressure on the latter, a bearing in the front portion of said spindle head supporting said shaft for rotation, and means associated with said shaft engaging said bearing operative to transmit thrust exerted along the shaft through said bearing and the front part of said spindle head to said transducer, whereby said thrust pressure augments said preload pressure and whereby the amount of said thrust pressure is a direct measure of the thrust exerted along said shaft.

10. In a machine having a rotatable shaft, a spindle head receiving said shaft having relatively spaced front and rear portions, a transducer confined between the front and rear portions of said spindle head, means interconnecting the front and rear portions of said spindle head to draw the same together and against said transducer whereby to exert a constant predetermined preload pressure on the latter, a bearing in the front portion of said spindle head supporting said shaft for rotation, and means associated with said shaft engaging said bearing and operative to transmit thrust exerted along the shaft through said bearing and the front part of said spindle head and against said transducer, whereby said thrust pressure augments the preload pressure of the transducer and whereby the amount of said thrust pressure is a direct measure of the thrust exerted along said shaft, and electrical indicating and recording means connected to said transducer operative to fully compensate the preload pressure on said transducer and to measure only the thrust pressure imposed thereon.

11. In a machine having a rotatable shaft, a spindle head receiving said shaft having relatively spaced front and rear portions, a transducer confined between the front and rear portions of said spindle head, means interconnecting the front and rear portions of said spindle head to draw the same together and against said transducer whereby to exert a constant predetermined preload pressure on the latter, a bearing having an outer race mounted in an internal annular recess provided in the front portion of said spindle head and an inner race surrounding and snugly fitting said shaft, said bearing supporting said shaft for rotation in said spindle head, and means forming a shoulder on the shaft seating rearwardly against the inner race of said bearing and operative to transmit thrust exerted along the shaft through said bearing and the front part of said spindle head and against said transducer to augment said preload pressure by an amount directly proportional to the amount of said thrust pressure.

12. In a machine having a cutting tool adapted to perform a cutting operation on a workpiece, tool carrying and actuating means operative to move the tool with force against a workpiece, a first indicating means for indicating a first operating condition of said tool, a control device controlling said first indicating means, a second indicating means for indicating a second operating condition of the tool, switch means controlling said second indicating means, means associated with said tool carrying and actuating means responsive to the force exerted by said tool against said work during operation of said tool for producing an output signal the amplitude of which varies as a function of the amplitude of said force, means cooperative with said signal producing means and said control device effective when the amplitude of said signal reaches a preselected relatively low value for operating said control device, and means cooperative with said signal producing means and said switch means effective when the amplitude of said signal reaches a different preselected relatively high value for operating said switch means.

13. In a machine having a cutting tool adapted to perform a cutting operation on a workpiece, tool carrying and actuating means operative to move the tool with force against a workpiece, a first indicating means for indicating a first operating condition of said tool, a control device controlling said first indicating means, a second indicating means for indicating a second operating condition of the tool, switch means controlling said second indicating means, means associated with said tool carrying and actuating means responsive to the force exerted by said tool against said work during operation of said tool for producing an output signal the amplitude of which varies as a function of the amplitude of said force, meter means associated with and operated by said signal producing means for continuously indicating the amplitude of said signal, means cooperative with said signal producing means and said control device effective when the amplitude of said signal reaches a preselected relatively low value for operating said control device, and means cooperative with said signal producing means and said switch means effective when the amplitude of said signal reaches a different preselected relatively high value for operating said switch means.

14. In a machine having a control circuit and a cutting tool adapted to perform a cutting operation on a workpiece, tool carrying and actuating means operative to move the tool with force against a workpiece, a warning means for indicating a first operating condition of said tool, a control device operatively connected to said warning means and rendering the same normally inoperative, normally closed switch means in the control circuit of said machine, means associated with said tool carrying and actuating means responsive to the force exerted by said tool against said work during operation of said tool for producing an output signal the amplitude of which varies as a function of the amplitude of said force, means cooperative with said signal producing means and said warning means effective when the amplitude of said signal reaches a preselected relatively low value for operating said warning means, and means cooperative with said signal producing means and said switch means effective when the amplitude of said signal reaches a different preselected relatively high value for opening said switch means whereby to interrupt the control circuit and terminate the operation of the machine.

15. In a machine having a cutting tool adapted to perform a cutting operation on a plurality of successive workpieces, tool carrying and actuating means operative to move the tool with force against each workpiece in succession, indicating means for indicating a predetermined operating condition of said tool, a control device controlling said indicating means, means associated with said tool carrying and actuating means responsive to the force exerted by said tool against said work during operation of said tool for producing an output signal the amplitude of which varies as a function with the amplitude of said force, and means cooperative with said signal producing means and said control device effective only when the amplitude of said signal reaches a preselected value a plurality of times for operating said control device.

16. In a machine having a cutting tool adapted to perform a cutting operation on a plurality of successive workpieces, tool carrying and actuating means operative to move the tool in successive operations with force against said workpieces, indicating means for indicating a predetermined operating condition of said tool, a control device controlling said indicating means, means associated with said tool carrying and actuating means responsive to the force exerted by said tool against said work during operation of said tool for producing an output signal the amplitude of which varies as a function with the amplitude of said force, and means cooperative with said signal producing means and said control device effective when the amplitude of said signal reaches a preselected value a predetermined number of times during the cutting operations on a predetermined number of workpieces for energizing said control device.

17. In a machine having a cutting tool adapted to perform cutting operations on a plurality of successive workpieces, tool carrying and actuating means operative to move the tool in successive operations with force against said workpieces, indicating means for indicating a predetermined operating condition of said tool, a control device controlling said indicating means, means associated with said tool carrying and actuating means responsive to the force exerted by said tool against said work during operation of said tool for producing an output signal the amplitude of which varies as a function with the amplitude of said force, and means cooperative with said signal producing means and said control device effective only when the amplitude of said signal reaches a preselected value during each of a plurality of cutting operations on successive workpieces for operating said control device.

18. In a machine having a cutting tool adapted to perform cutting operations on successive workpieces, tool carrying and actuating means operative to move the tool in successive operations with force and at a constant rate of speed against said workpieces, means associated with said tool carrying and actuating means responsive to the force exerted by said tool against the work during operation of said tool for providing a signal having an amplitude which is a function of the amplitude of said force, an indicating device, means coactive with said force-responsive means and said indicating device rendered operative when the amplitude of said signal and hence the amplitude of said force reaches a predetermined value to operate said indicating device, and a control circuit for controlling said tool carrying and actuating means including control means operatively connected to said force-responsive means and responsive to said signal from the latter of a different predetermined value to operate said control circuit.

19. In a machine having a cutting tool adapted to perform cutting operations on successive workpieces, tool carrying and actuating means operative to move the tool in successive operations with force and at a constant rate of speed against said workpieces, means associated with said tool carrying and actuating means responsive to the force exerted by said tool against the work for providing a signal having an amplitude which is a function of the amplitude of said force, and a control circuit for controlling said tool carrying and actuating means including control means operatively connected to said force-responsive means and responsive to said signal from the latter only when the amplitude of said signal reaches a preselected value a plurality of times to operate said control circuit.

20. In a machine having a cutting tool adapted to perform cutting operations on successive workpieces, tool carrying and actuating means operative to move the tool in successive operations with force and at a constant rate of speed against said workpieces, means associated with said tool carrying and actuating means responsive to the force exerted by said tool against the work for providing a signal having an amplitude which is a function of the amplitude of said force, and a control circuit for controlling said tool carrying and actuating means including control means operatively connected to said force-responsive means and responsive to said signal from the latter only when the amplitude of said signal reaches a preselected value a predetermined number of times during the cutting operation on a predetermined number of workpieces to operate said control circuit.

21. In a machine having a cutting tool adapted to perform cutting operations on successive workpieces, tool carrying and actuating means operative to move the tool in successive operations with force and at a constant rate of speed against workpieces, means associated with said tool carrying and actuating means responsive to the force exerted by said tool against the work for providing a signal having an amplitude which is a function of the amplitude of said force, and a control circuit for controlling said tool carrying and actuating means including control means operatively connected to said force-responsive means and responsive to said signal from the latter only when the amplitude of said signal reaches a preselected value during each of a plurality of cutting operations on successive workpieces to operate said control circuit.

References Cited in the file of this patent
UNITED STATES PATENTS

| | | |
|---|---|---|
| 2,030,335 | Svenson | Feb. 11, 1936 |
| 2,054,787 | Beavers | Sept. 22, 1936 |
| 2,240,795 | Morgan | May 6, 1941 |
| 2,329,541 | Kuehni | Sept. 14, 1943 |
| 2,397,974 | Morrow | Apr. 9, 1946 |
| 2,448,167 | Baak | Aug. 19, 1948 |
| 2,759,580 | Bower | Aug. 21, 1956 |
| 2,790,340 | Cross | Apr. 30, 1957 |